Dec. 30, 1924.
O. KÖLSCH
VALVE
Filed June 20, 1924
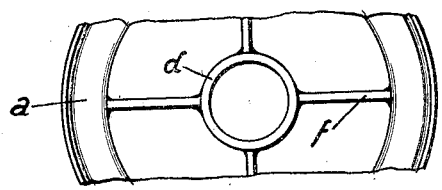
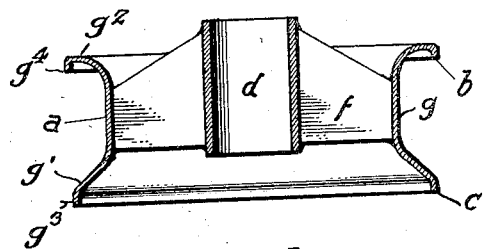
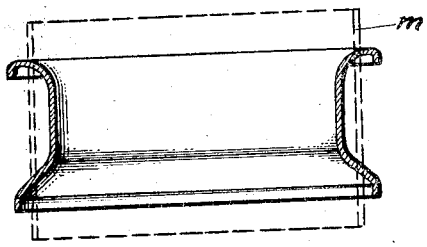
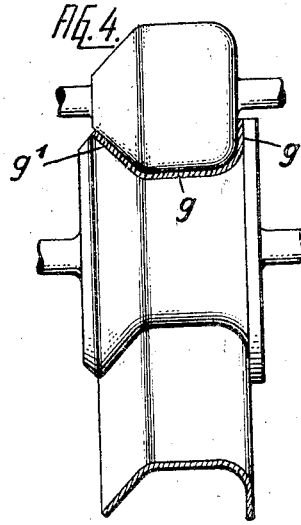
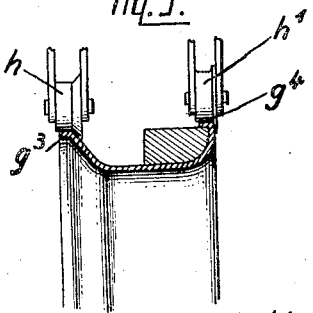

Patented Dec. 30, 1924.

1,521,447

UNITED STATES PATENT OFFICE.

OTTO KÖLSCH, OF BADEN, GERMANY, ASSIGNOR TO THE FIRM HEINRICH LANZ, OF MANNHEIM, BADEN, GERMANY, A COPARTNERSHIP.

VALVE.

Application filed June 20, 1924. Serial No. 721,275.

*To all whom it may concern:*

Be it known that I, OTTO KÖLSCH, a citizen of Germany, residing at Mannheim, Baden, Germany, have invented certain new and useful Improvements in Valves, of which the following is a specification.

The present invention relates to valves, and more particularly to control valves for fluid motors; and it consists, essentially, in making the valve of Mannesmann or equivalent seamless tubing.

As compared with the old valves of this type, which have either been cast or been turned or stamped out as a whole or shaped up from two blanks and welded, my new valve has two distinct advantages, namely, it is stronger and it can be produced at lower cost.

The invention is shown, by way of illustration and not of limitation, in the accompanying drawing, in which—

Figure 1 is a broken top or plan view, and Fig. 2 is a view in vertical section, of the finished valve; and Figs. 3, 4 and 5 illustrate steps in the process of its manufacture.

The valve here shown consists of an annular outer valve body $a$, the valve proper, which has a more or less cylindrical central portion $g$ with outwardly flaring ends $g^1$ $g^2$ terminating in flanges $g^3$ $g^4$ which provide the seat faces $b$ and $c$, and the valve spindle guide $d$ which is secured in place, within the body, in any suitable manner—for example, by radial ribs welded or soldered at their ends. The tubing $m$ of which the valve is made (shown in dotted lines in Fig. 3), preferably of somewhat greater diameter than the cylindrical central portion of the finished valve, is rolled to shape between suitable rolls (see Fig. 4), the rolls reducing the walls of the tubing through the central portion and expanding them at the ends. The flanges which provide the seat faces are formed on a lathe by means of suitable flanging tools $h$ $h^1$ (see Fig. 5).

What I claim as new, and desire to secure by Letters Patent, is—

1. A valve of the type described having an integral seamless annular body consisting of a length of seamless tube which has been rolled to shape.

2. A valve of the type described which comprises an integral seamless annular body which is formed by rolling to shape a section of drawn seamless tubing, and a spindle guide supported coaxially therein by radial ribs.

3. A double-seat control valve for fluid motors which comprises an integral seamless annular body of Mannesmann tubing rolled to shape and a spindle guide supported by radial ribs the outer ends of which are united to the walls of the body.

OTTO KÖLSCH.